United States Patent
Patton

(10) Patent No.: US 8,695,373 B1
(45) Date of Patent: Apr. 15, 2014

(54) SEGMENTED LINER SYSTEM WITH MICROENCAPSULATED PHASE CHANGE MATERIAL

(76) Inventor: Claire Jean Patton, Columbus, OH (US)

( * ) Notice: Subject to any disclaimer, the term of this patent is extended or adjusted under 35 U.S.C. 154(b) by 1000 days.

(21) Appl. No.: 12/611,014

(22) Filed: Nov. 2, 2009

Related U.S. Application Data

(60) Provisional application No. 61/110,598, filed on Nov. 2, 2008.

(51) Int. Cl.
| | | |
|---|---|---|
| F25D 3/08 | (2006.01) |
| F17C 13/00 | (2006.01) |
| F25B 21/00 | (2006.01) |
| A47G 19/00 | (2006.01) |
| A47G 21/00 | (2006.01) |
| A47G 23/00 | (2006.01) |
| A47J 39/00 | (2006.01) |
| A47J 41/00 | (2006.01) |
| B65D 81/38 | (2006.01) |
| B65D 83/72 | (2006.01) |
| B65D 88/74 | (2006.01) |
| F25D 23/00 | (2006.01) |

(52) U.S. Cl.
USPC .......... 62/457.6; 62/530; 62/457.2; 62/457.9; 220/574.2; 220/574.3; 220/592.01; 220/592.05; 220/592.16

(58) Field of Classification Search
USPC ........ 62/530, 457.6, 457.2, 457.9; 220/574.2, 220/574.3, 592.01, 592.05, 592.16
See application file for complete search history.

(56) References Cited

U.S. PATENT DOCUMENTS

| | | | |
|---|---|---|---|
| 4,311,022 A | 1/1982 | Hall | |
| 4,575,097 A | 3/1986 | Brannigan | |
| 4,841,743 A | 6/1989 | Brier | |
| 4,886,063 A | 12/1989 | Crews | |
| 4,931,333 A | 6/1990 | Henry | |
| 5,005,374 A * | 4/1991 | Spitler | 62/259.3 |
| 5,007,478 A | 4/1991 | Sengupta | |
| 5,843,145 A | 12/1998 | Brink | |
| 6,269,654 B1 * | 8/2001 | Murray et al. | 62/530 |
| 6,601,403 B1 * | 8/2003 | Roth et al. | 62/457.2 |
| 6,789,393 B2 | 9/2004 | Dais | |
| 6,948,334 B1 | 9/2005 | Challenger | |
| 7,051,550 B2 * | 5/2006 | Roth et al. | 62/457.2 |
| 7,380,412 B2 | 6/2008 | Roth | |
| 2003/0149461 A1 | 8/2003 | Johnson | |
| 2005/0183446 A1 * | 8/2005 | Fuchs | 62/457.7 |
| 2005/0218146 A1 * | 10/2005 | Thissen | 220/592.28 |
| 2007/0104988 A1 * | 5/2007 | Nishii et al. | 429/26 |

* cited by examiner

*Primary Examiner* — Judy Swann
*Assistant Examiner* — Zachary Anderegg
(74) *Attorney, Agent, or Firm* — Claire J. Patton

(57) ABSTRACT

A temperature maintenance system for use with nested containers includes a segmented wall liner assembly and removable cover. The segmented wall liner assembly includes a plurality of segments formed in an array, with each of the segments connected to at least one of the other of the segments, and which extend radially outward from a central point. Each of the segments has a plurality of sections, and each of the sections has a central compartment which contains phase change material. The segmented wall liner assembly is capable of changing from a substantially flat, open position, to an angular position when removably disposed in-between the nested containers, and the nested containers have substantially concave surfaces, whereby the segments conform to the substantially concave surfaces when the segmented wall liner assembly is in the angular position.

14 Claims, 5 Drawing Sheets

SEGMENTED LINER SYSTEM WITH MICROENCAPSULATED PHASE CHANGE MATERIAL

This application claims priority of provisional patent application No. 61/110,598, titled "Segmented Liner System With Microencapsulated Phase Change Material", filed Nov. 2, 2008 by the present inventor.

REFERENCE TO RELATED APPLICATIONS

Provisional patent application No. 61/110,598, filed Nov. 2, 2008 by the present inventor.

FEDERALLY SPONSORED RESEARCH

Not Applicable

SEQUENCE LISTING OR PROGRAM

Not Applicable

BACKGROUND OF THE INVENTION

This invention generally relates to systems used in temperature maintenance, and specifically to a segmented liner system having compartments containing microencapsulated phase change material.

The use of phase change material to maintain the temperature of items within containers is well known in the art. For cooling applications, phase change materials are chosen for their low melting points, high heat of fusion, and capacity to store large amounts of heat energy. The microencapsulation of phase change materials (PCMs) provides for preferably plastic casings to enclose small particles of PCM, and allows easier handling of the material, and increases the range of applications where the materials can be used in temperature regulation or maintenance. The use of microencapsulated PCM in a liner assembly enables the system to absorb more heat energy, and thus prolong the cooling effect.

Many designs exist that consist of a double-wall container system with provisions to maintain the temperature of items stored within. The double-wall feature creates an interstitial space, and the interstitial space can be either filled with PCM, or can contain an integral or removable liner member filled with PCM. These designs can also include an exterior insulation layer. This type of double-wall container is relatively complex and expensive to manufacture, and the utility is somewhat limited in application. With most double wall designs in a cooling application, the entire container or a bulky liner is required to be precharged in the freezer, taking up valuable storage space. Other designs for thermal containers use one or more separate, removable pouches, sacks, or bricks, used as interior gel packs, containing PCMs. These can be placed on the interior side of the container, surrounding the item to be cooled. However, such direct contact is not always feasible where it is necessary for the item being heated or cooled to be isolated, out of direct contact with the gel packs. For example, a user may require that food being served at a picnic or potluck not be in direct contact with one or more gel packs, and would prefer using a double-wall container with PCM liner.

Normally, gel packs are rigid pouches in their frozen state, and the large packs cannot be easily bent to conform to a curved container surface, such as a standard bowl. Food serving applications can often employ containers with concave, curved surfaces, making it more difficult to provide proper contact between the container surfaces and the traditional gel pack. In addition, it is difficult to adequately cover substantially the entire curved bowl surface with a series of rectangular gel packs. In such an application, there is a need for a flexible, segmented, removable liner system which may be used in-between nested, curved containers. There is a further need to augment the temperature maintenance of such containers with a top cover which also employs a segmented liner with microencapsulated PCM.

SUMMARY OF THE INVENTION

In the present invention system, a PCM filled segmented liner assembly is arranged in the space in-between two nested, conventional, substantially concave containers, where the containers can also be employed for other uses. In a cooling application, the liner serves to absorb heat in order to assist in maintaining the temperature of items kept inside the curved container. The PCM filled segmented liner assembly may be removed from the containers and folded or laid flat to conveniently store in the user's freezer when not in use.

In one embodiment, a temperature maintenance system for use with nested containers comprises a segmented wall liner assembly. The segmented wall liner assembly comprises a plurality of segments formed in an array, with each of the segments connected to at least one of the other of the segments, and which extend radially outward from a central point. Each of the segments has a plurality of sections, and each of the sections has a central compartment which contains phase change material. The segmented wall liner assembly is capable of changing from a substantially flat, open position, to an angular position when removably disposed in-between the nested containers, and the nested containers comprise substantially concave surfaces, whereby the segments conform to the substantially concave surfaces when the segmented wall liner assembly is in the angular position.

In one embodiment, a temperature maintenance system wherein each of the segments connects to at least one of the other segments at their proximal ends. In one embodiment, a temperature maintenance system wherein each of the segments connects to and extends radially from a central core section. In one embodiment, a temperature maintenance system wherein the segments comprise a plurality of first segments and second segments, whereby each of the first segments connects to and extends radially from a central core section, and each of the second segments connects to and is disposed adjacent to one of the first segments, and the proximal end of each of the first segments connects to the peripheral edge of the central core section, and the proximal end of each of the second segments connects to a peripheral edge of one of the first segments.

In one embodiment, a temperature maintenance system wherein the sections are formed in a polygon shape of at least four sides. In one embodiment, a temperature maintenance system wherein the phase change material is microencapsulated. In one embodiment, a temperature maintenance system wherein each section of the segments connects to an adjacent section along one peripheral edge by a portion of a peripheral material web, whereby the adjoining sections may be folded or bent at an angle relative to each other. In one embodiment, a temperature maintenance system wherein the segments of the segmented wall liner assembly in the angled position converge, whereby adjacent segments substantially touch or overlap each other.

In one embodiment, a temperature maintenance system for use with nested containers comprises a segmented wall liner assembly and a removable cover. The wall liner assembly comprises a plurality of first segments and second segments, formed in an array, wherein each of the first segments connects to and extends radially from a central core section. Each of the second segments connects to and is disposed adjacent to one of the first segments, and each of the segments has a plurality of sections. The cover has at least two equally divided first and second portions, and the portions are foldable relative to each other. Each of the portions has first and second cover surfaces, and the first and second surfaces are disposed on either side of a cover liner assembly. The cover liner assembly also comprises a plurality of sections. Each of the segmented wall liner assembly and cover liner assembly sections has a central compartment containing phase change material. The segmented wall liner assembly is capable of changing from a substantially flat, open position, to an angular position when removably disposed in-between the nested containers, and the nested containers comprise substantially concave surfaces, whereby the segments conform to the substantially concave surfaces when the segmented wall liner assembly is in the angular position.

DRAWINGS—FIGURES

DETAILED DESCRIPTION

Figure 1:
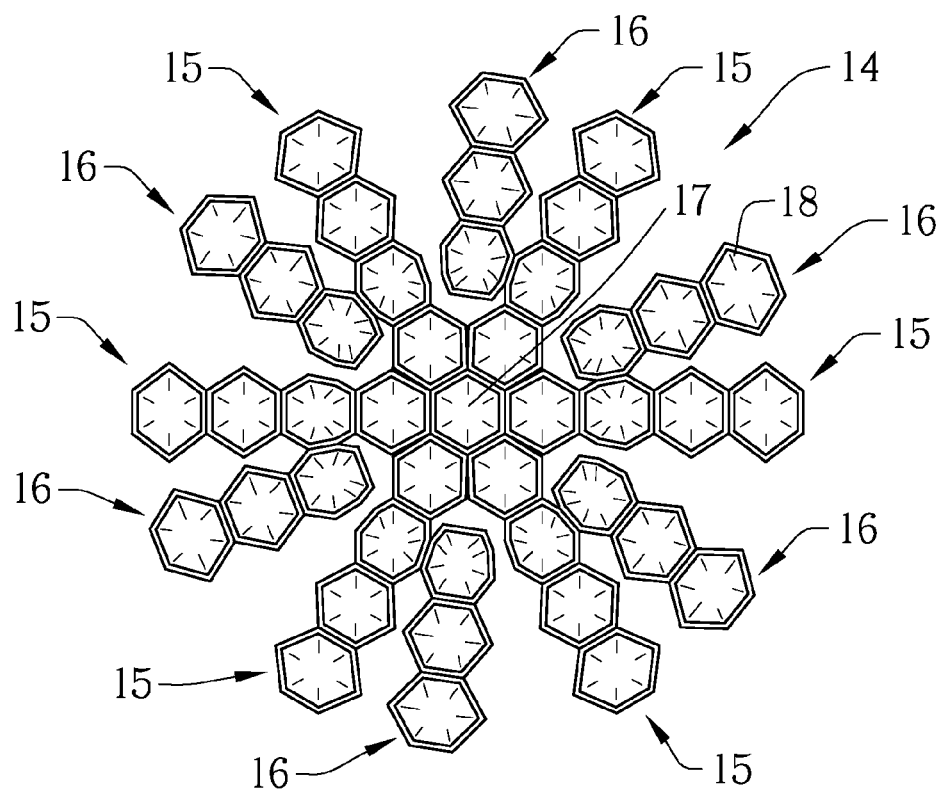
FIG. 1 is a top view of one embodiment of the wall liner assembly of the present invention showing segments in the flat, open position.

As best illustrated in FIG. 4, the present invention includes a temperature maintenance system 10 for use with nested containers 11 and 12 which comprises segmented wall liner assembly 14 and cover 13. As shown in FIG. 1, segmented wall liner assembly 14 includes a plurality of first segments 15 and second segments 16, formed in an array, where each of first segments 15 connects to and extends radially from a central core section 17, and each of second segments 16 connects to and is disposed adjacent to one of first segments 15. In the open position, as shown in FIG. 1, the segments 15 and 16 of wall liner assembly 14 may be spread out substantially flat when not used inside a concave container. The proximal end of each of first segments 15 connects to the peripheral edge of the central core section 17. Similarly, the proximal end of each of second segments 16 connects to a peripheral edge of one of first segments 15.

Figure 2:
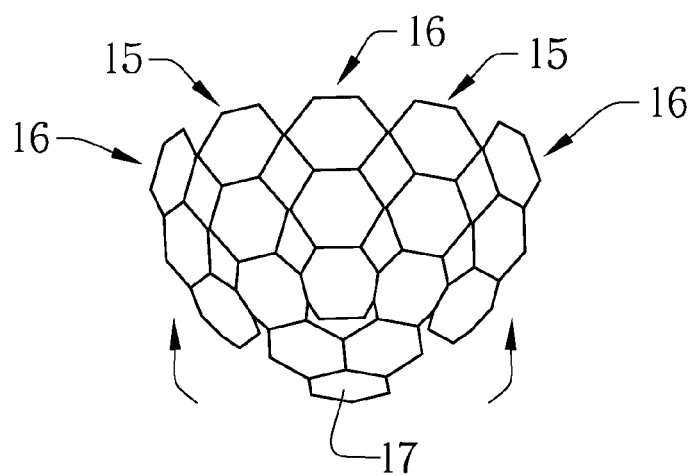
FIG. 2 is a perspective partial side view of one embodiment of the wall liner assembly of the present invention, showing segments folded up in the angled position (detail of individual compartments not shown).
Figure 3:
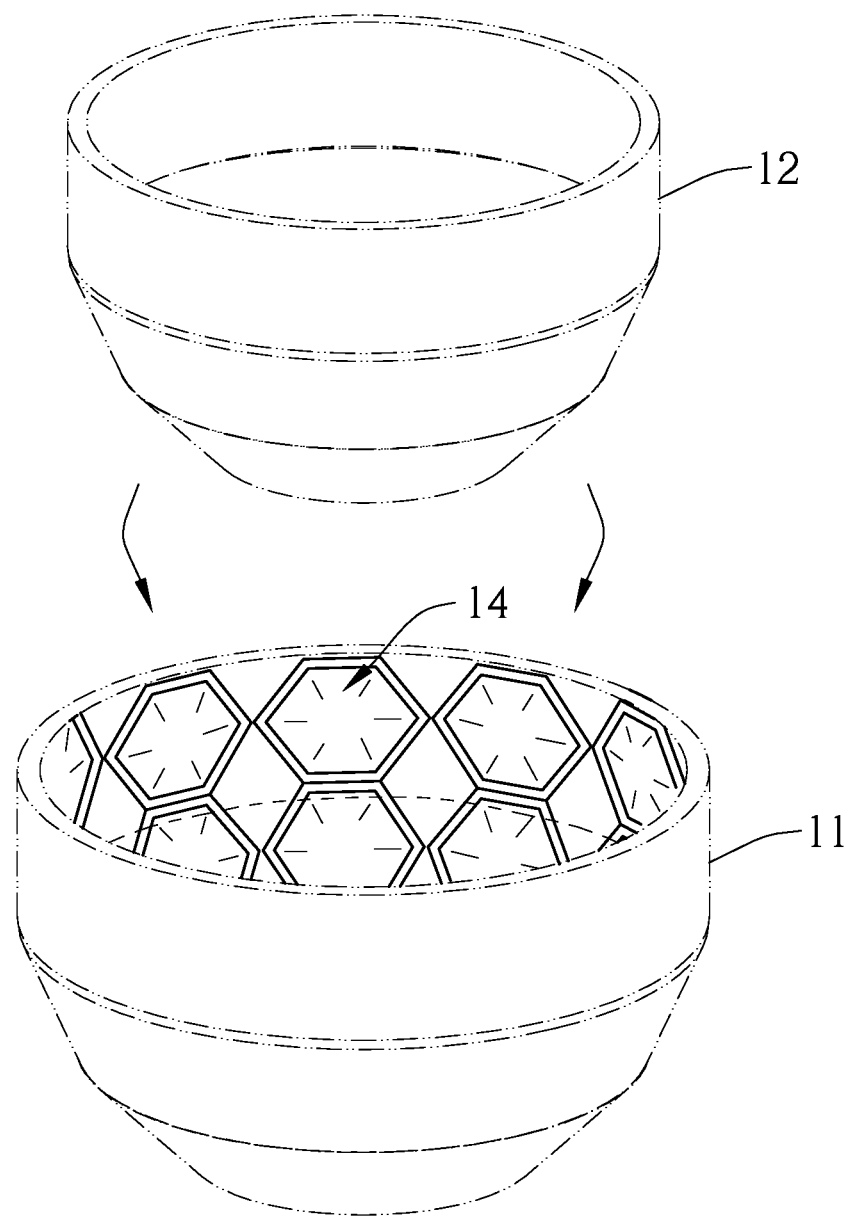
FIG. 3 is a perspective view of one embodiment of the present invention showing the wall liner assembly inside the outer container and the inner container positioned above.
Figure 6:
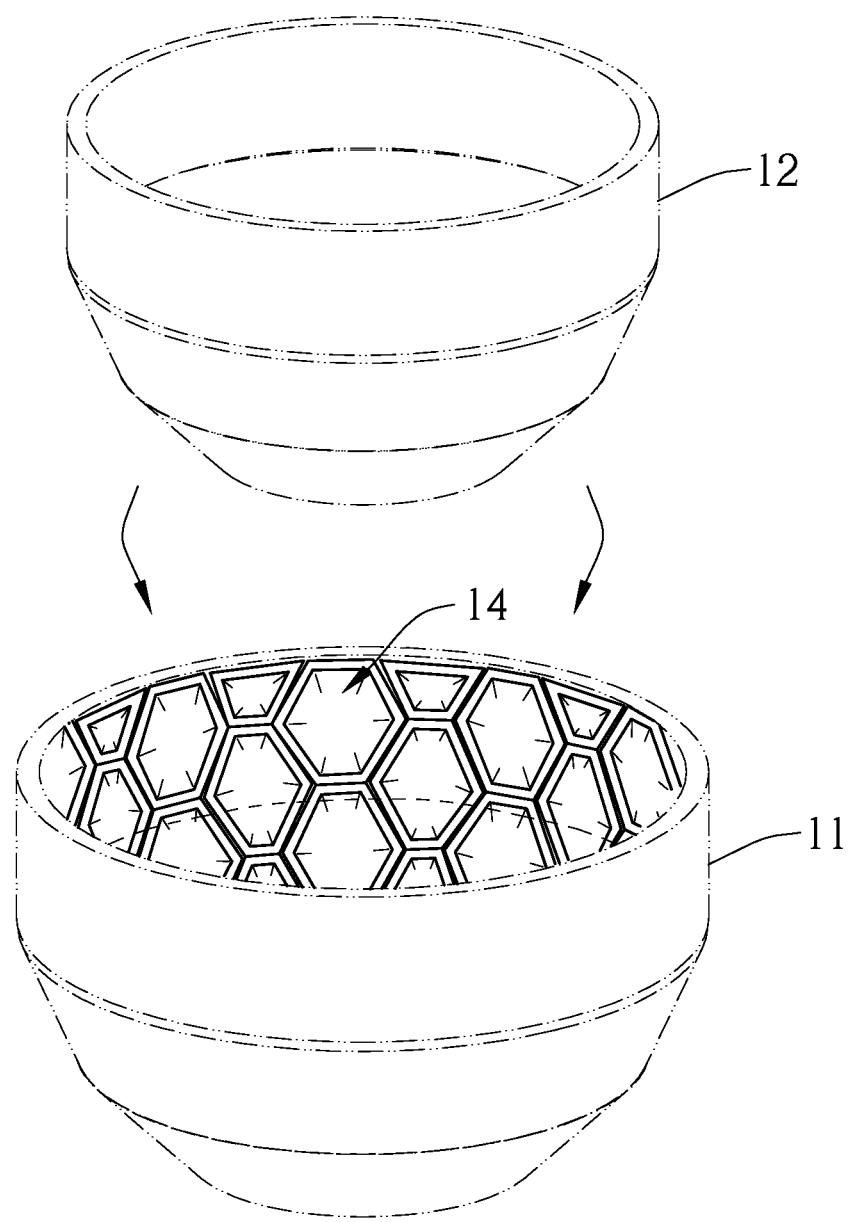
FIG. 6 is a perspective view of an alternative embodiment of the liner.

FIGS. 3, 4 and 6 show nested containers 11 and 12 have substantially concave surfaces. In use, segmented wall liner assembly 14 is removably disposed in-between nested containers 11 and 12, and the segments conform to the curved shape by folding, thus changing to an angled position, as shown in FIGS. 2, 3, and 6. In the angled position, the distal end of each of first segments 15 may be disposed substantially adjacent to or extend beyond the peripheral rim of the nested containers 11 and 12. Similarly, the distal end of each of second segments 16 may be disposed substantially adjacent to or extend beyond the peripheral rim of the nested containers 11 and 12.

Each segment 15 and 16 has a plurality of sections 18, and each section 18 is formed in a polygon shape of at least four sides. The central core section 17 is also formed in a polygon shape of at least four sides. The preferred section shape is a hexagon, as this geometry lends itself to more efficient coverage of a curved surface. The sections 18 comprising one segment may have different shapes and sizes, and may be configured to minimize the space between adjacent segments and sections when formed into the angular position, as shown in alternate embodiment FIG. 6, thus maximizing the available cooling effect.

Segmented wall liner assembly 14 is formed from a plurality of plastic sheeting, preferably of two sheets. Each section 18 of the liner has a central compartment 19 that serves to enclose the PCM 20, and which is comprised of the two plastic sheets joined by sealing along the compartment's peripheral edge to contain the material inside compartment 19. The sealing may be performed by heat sealing, by use of an adhesive, or by other means of attaching the two sheets. The number of segments may vary, as well as the number and size of sections. In a segment, each section 18 connects to the adjacent section along one peripheral edge by a portion of the peripheral material, or web 21. The segments 15 and 16 are thus formed from a chain of connecting sections 18. The preferred embodiment of segmented wall liner assembly 14 of the present invention includes an array layout where every other segment in the array is a second segment 16 that connects to an adjacent first segment 15 instead of connecting directly to the central core section (as depicted in FIG. 1). Alternatively, all segments may connect at their proximal ends to the central core section, or all segments may connect to at least one of the other segment at their proximal ends, extending radially outward from a central point, without employing a central core section 17.

The liner assembly is formed of a flexible, durable plastic material which allows for washing or cleaning of the liner assembly as needed. The liner may be reused multiple times by refreezing in the user's freezer. The preferred embodiment for the present invention is in a cooling mode, maintaining items at a cool temperature in ambient conditions over a short period of time, but alternate PCMs may be used to maintain items at warm temperatures.

In the wall liner assembly and cover, the portion of material along the periphery of each compartment 19 is the web 21. Preferably, the adjoining sections 18 are interconnected along at least one edge by the web 21. In segmented wall liner assembly 14, the amount of web material provided between compartment sections in a segment is such that the adjoining sections 18 may be folded or bent at an angle relative to each other. Segmented wall liner assembly 14 may thus be folded in various ways to enable the best fit for storage in the user's freezer, and to conform to the shape of the containers used, as shown in FIGS. 2-4. In the angled position, placed inside the outer container 11, the segments 15 and 16 are easily folded or bent at an angle to conform to the curved shape of the container surface. This allows the converging adjacent segments 15 and 16 to substantially touch or overlap each other, in order to more effectively cover the surface area of the container.

Figure 4A:
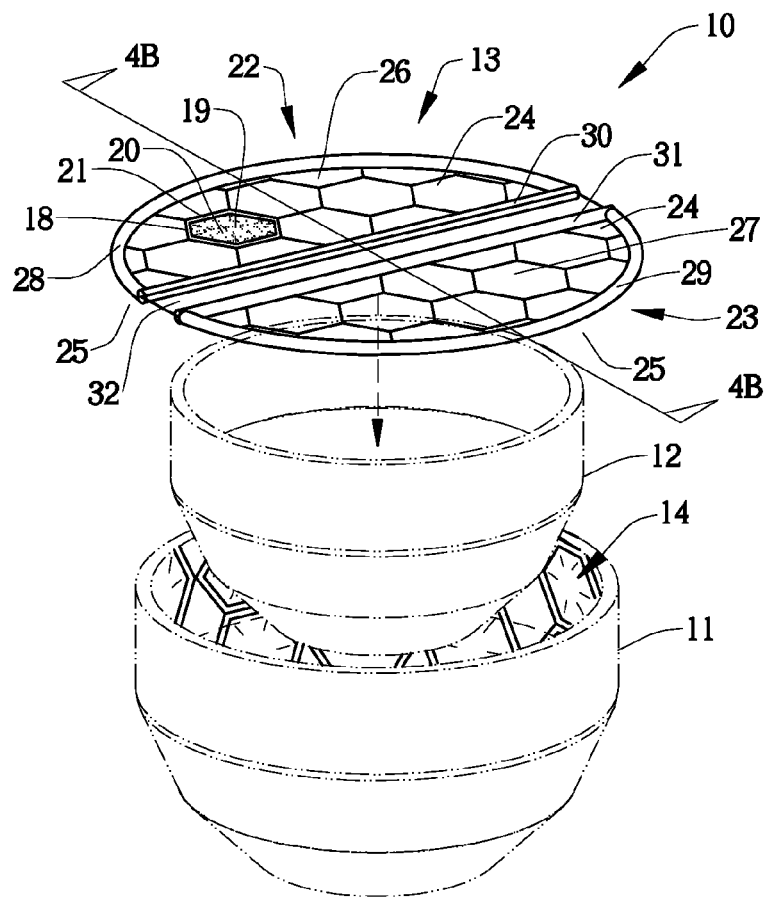
FIG. 4A is an exploded perspective view of one embodiment further showing the inner container partially nested inside the outer container, and the cover positioned above.
Figure 4B:
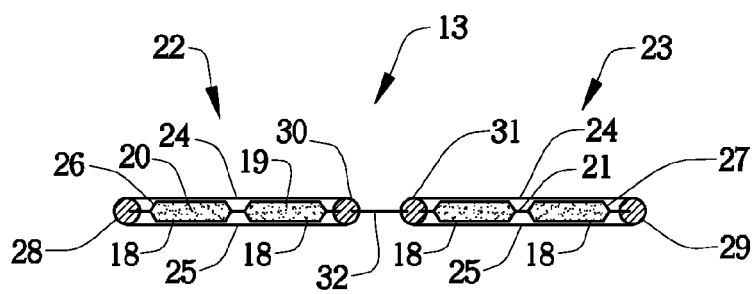
FIG. 4B is a section view of one embodiment of the cover.
Figure 5:
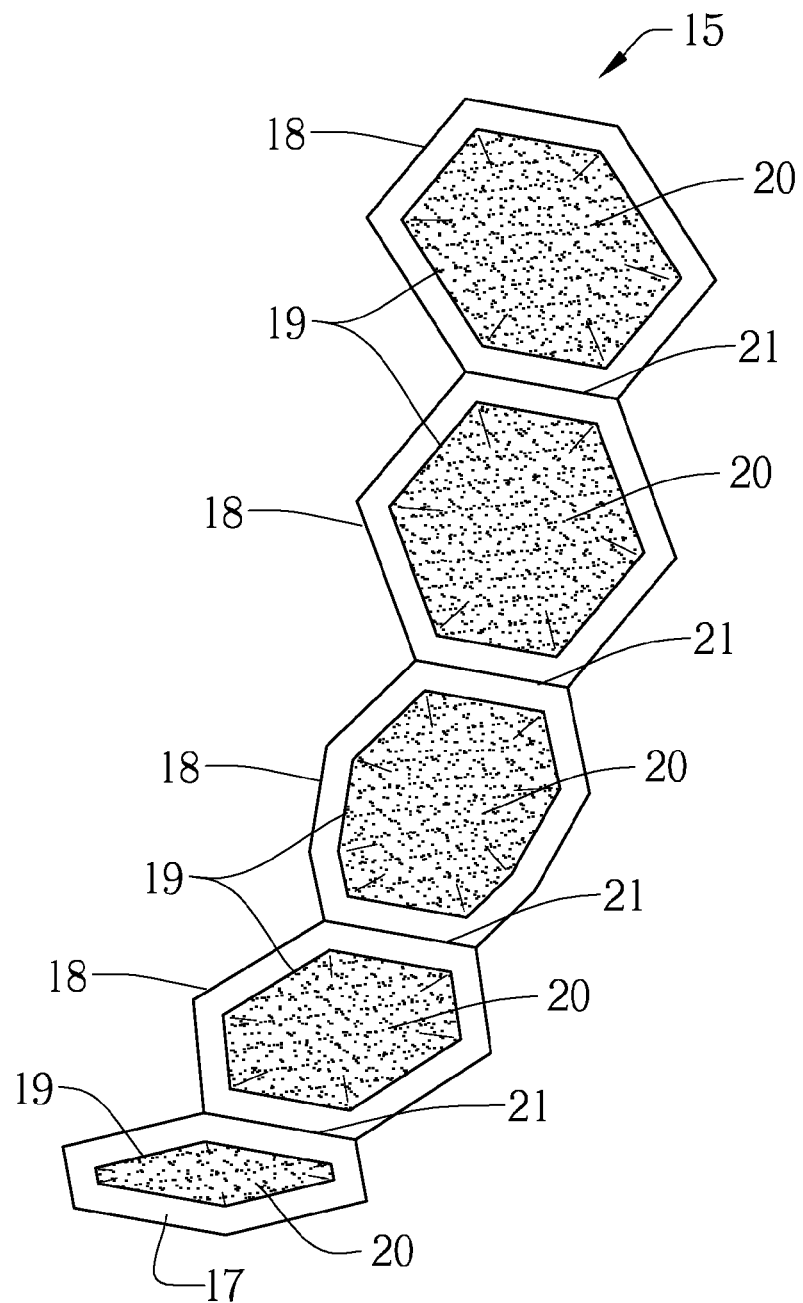
FIG. 5 is an enlarged view of a segment of one embodiment.

A loose fitting removable cover 13 may be used as an optional accessory to the system, in addition to segmented wall liner assembly 14. As shown in FIGS. 4A and 4B, cover 13 has preferably at least two equally divided first and second portions 22 and 23, respectively, which are foldable relative to each other. Thus, either portion 22 or 23 may be opened to permit access to the container contents. Each of the cover portions 22 and 23 includes two, preferably flat, first and second cover surfaces 24 and 25, respectively, and the two surfaces are disposed on either side of first and second cover liner assemblies 26 and 27, respectively. Cover surfaces 24 and 25 are preferably formed of a substantially stiff, durable plastic material. Each of first and second cover liner assemblies 26 and 27 include first and second annular trim clips 28 and 29, respectively, disposed along the cover liner assembly outer periphery, and first and second hinge clips 30 and 31, respectively, disposed along the cover liner assembly inner edge. The cover first and second portions 22 and 23, respectively, are joined along their inner edges at first and second hinge clips 30 and 31 by a folding means 32. Folding means 32 is preferably a portion of flexible plastic web material constructed to allow folding back of one portion of the cover on top of the other portion. Alternatively, folding means 32 may be a hinge or joint which allows one portion of the cover to be folded or opened angularly relative to the other portion. This permits the user to keep cover 13 closed for transit, and to open one side portion of the cover for serving access.

Cover liner assemblies 26 and 27 are constructed similar to the wall liner assembly 14, having a plurality of sections 18, and each section having a central compartment 19 for containing PCM 20 (only one section is shown detailed in FIG. 4). Preferably, cover sections 18 are interconnected by webs 21 to form a solid, one-piece cover liner. Alternatively, cover liner sections 18 may be formed into segmented liners that leave some open spaces between segments, to allow for ventilation of the container contents, or ventilation openings may be provided through the webbing material of a solid cover liner.

Cover 13 may be made in various diameters to better accommodate different sizes of containers that may be used in the system. Preferably, the cover diameter is sized such that the trim clips 28 and 29 are disposed outside of the outer perimeter of the outer container 11 that is used. Alternatively, one cover may be used with various sizes of pre-existing containers, such that the cover trim clips 28 and 29 may also be disposed inside the inner perimeter of a smaller diameter outer container. In either case, cover folding means 32 allows for one portion of the cover to be opened or folded up on top of the other portion.

Each liner section 18 in the system has a central compartment 19 for containing PCM 20. Each compartment 19 is preferably about ¼" to ½" thickness when filled substantially full of PCM 20, and the flexible plastic material allows for a slight compression of the compartment 19 when disposed in-between the two nested containers 11 and 12, or between the two cover surfaces of cover 13. Sealed compartments 19 joined by webs 21 allow for a quilting effect that provides an even distribution of the PCM in the liner assembly.

The microencapsulation of PCM is known in the art. For one embodiment, paraffin is the preferred PCM, but various PCMs may be used. The encapsulated material may be in the form of a wet cake or dry powder, or in a more fluid form, as a slurry. The microencapsulation feature of the PCM assists the material in deforming as it conforms to the curved surfaces of the nested containers. The preferred phase change material to be used in the present invention is comprised of microencapsulated PCM, but may also include macroencapsulated or unencapsulated PCM.

Preferably, the liner assembly may be used as an insert, in-between two nested containers, or optionally, in-between two surfaces of a container cover. Optionally, an additional insulating outer enclosure may be added to the system, preferably on the outside of the outer container to aid in temperature maintenance. The size of the sections, segments, and liner array may vary to accommodate various applications and containers.

Alternatively, the segmented wall liner assembly may be used with only the outer container, and disposed in direct contact with the item needing temperature regulation, as in lining a bowl of apples. The wall liner assembly may also be used to prolong the freshness of cut flowers, being disposed inside a curved container or a rectangular receptacle. The segmented wall liner assembly may be used without containers, as a wrap draped over items, as in temporarily covering a container of ice cream or a milk jug during a party. In the case of body parts in need of cooling or heating, the wall liner assembly may be wrapped on or draped over a body part, the structure allowing for conformity to the curvature of the body part. Thus, a temperature maintenance system using a segmented liner assembly enables the user to preserve the freshness, taste, and sanitation of food, or to regulate the temperature of other items as needed.

Various modifications and changes to the above description and illustrations should be apparent to those skilled in the art, and it is not intended to limit the scope of the invention to the exact construction and operation shown and described. Thus, the scope of the invention should be determined by the appended claims and their legal equivalents, and not by the examples given.

The invention claimed is:

1. A temperature maintenance system for use with nested containers comprising:
   a segmented wall liner assembly;
   the segmented wall liner assembly comprising a plurality of segments formed in an array;
   each of said segments being connected to at least one of the other of said segments, and extending radially outward from a central point;
   each of said segments having a plurality of sections, and each of said sections having a central compartment containing phase change material;
   said segmented wall liner assembly changing from a substantially flat, open position, to an angular position when removably disposed in-between said nested containers, and said nested containers comprising substantially concave surfaces, whereby said segments conform to said substantially concave surfaces when said segmented wall liner assembly is in said angular position; and
   wherein said segments comprise a plurality of first segments and second segments, whereby each of said first segments connects to and extends radially from a central core section, each of said second segments connects to and is disposed adjacent to one of said first segments, wherein a proximal end of each of said first segments connects to a peripheral edge of said central core section, and a proximal end of each of said second segments connects to a peripheral edge of one of said first segments.

2. A temperature maintenance system for use with nested containers comprising:
   a segmented wall liner assembly and a removable cover;
   the segmented wall liner assembly comprising a plurality of first segments and second segments, formed in an array, wherein each of said first segments connects to and extends radially from a central core section, and each of said second segments connects to and is disposed adjacent to one of said first segments, each of said first and second segments having a plurality of sections; and said cover having at least two equally divided first and second portions, said portions being foldable relative to each other, and each of said portions having first and second cover surfaces, said first and second cover surfaces being disposed on either side of a cover liner assembly, said cover liner assembly comprising a plurality of sections;

each of said segmented wall liner assembly and cover liner assembly sections having a central compartment containing phase change material, and said segmented wall liner assembly changing from a substantially flat, open position, to an angular position when removably disposed in-between said nested containers, and said nested containers comprising substantially concave surfaces, whereby said segments conform to said substantially concave surfaces when said segmented wall liner assembly is in said angular position.

3. A temperature maintenance system for use with nested containers comprising:

a segmented wall liner assembly; and a removable cover, wherein said cover having at least two equally divided first and second portions, said portions being foldable relative to each other, and each of said portions having first and second cover surfaces; said first and second surfaces being disposed on either side of a cover liner assembly, said cover liner assembly comprising a plurality of sections, and each of said segment sections and cover liner sections having a central compartment containing phase change material;

the segmented wall liner assembly comprising a plurality of segments formed in an array;

each of said segments being connected to at least one of the other of said segments, and extending radially outward from a central point;

each of said segments having a plurality of sections, and each of said sections having a central compartment containing phase change material; said segmented wall liner assembly changing from a substantially flat, open position, to an angular position when removably disposed in-between said nested containers, and said nested containers comprising substantially concave surfaces, whereby said segments conform to said substantially concave surfaces when said segmented wall liner assembly is in said angular position.

4. The temperature maintenance system of claim 1, wherein each of said segments connects to at least one of the other of said segments at their proximal ends.

5. The temperature maintenance system of claim 1, wherein said sections are formed in a polygon shape of at least four sides.

6. The temperature maintenance system of claim 1, wherein said phase change material is microencapsulated.

7. The temperature maintenance system of claim 1, wherein each said section of said first and second segments connects to an adjacent section along one peripheral edge by a portion of a peripheral material web, whereby said adjoining sections may be folded or bent at an angle relative to each other.

8. The temperature maintenance system of claim 1, wherein said segments of said segmented wall liner assembly in said angular position converge, whereby adjacent segments substantially touch or overlap each other.

9. The temperature maintenance system of claim 1, further comprising a removable cover, wherein said cover having at least two equally divided first and second portions, said portions being foldable relative to each other, and each of said portions having first and second cover surfaces; said first and second surfaces being disposed on either side of a cover liner assembly, said cover liner assembly comprising a plurality of sections, and each of said cover liner sections having a central compartment containing phase change material.

10. The temperature maintenance system of claim 2, wherein said segment sections and cover liner sections are formed in a polygon shape of at least four sides.

11. The temperature maintenance system of claim 2, wherein said phase change material is microencapsulated.

12. The temperature maintenance system of claim 2, wherein each said section of said segments connects to an adjacent section along one peripheral edge by a portion of a peripheral material web, whereby said adjoining sections may be folded or bent at an angle relative to each other.

13. The temperature maintenance system of claim 2, wherein said segments of said segmented wall liner assembly in said angled position converge, whereby adjacent segments substantially touch or overlap each other.

14. The temperature maintenance system of claim 1, wherein each of said sections extends radially from a central core section.

* * * * *